(12) United States Patent
Weaver

(10) Patent No.: US 7,440,027 B2
(45) Date of Patent: Oct. 21, 2008

(54) MOUNTING ASSEMBLY FOR CAMERA

(75) Inventor: Dennis L Weaver, Columbia, PA (US)

(73) Assignee: Robert Bosch GmbH, Stuttgart (DE)

( * ) Notice: Subject to any disclaimer, the term of this patent is extended or adjusted under 35 U.S.C. 154(b) by 714 days.

(21) Appl. No.: 10/799,509

(22) Filed: Mar. 12, 2004

(65) Prior Publication Data

US 2005/0200751 A1    Sep. 15, 2005

(51) Int. Cl.
*H04N 5/225* (2006.01)
*H04N 7/18* (2006.01)
*G03B 17/00* (2006.01)

(52) U.S. Cl. .......................... 348/375; 348/151; 396/427
(58) Field of Classification Search .................. 348/151; 396/427
See application file for complete search history.

(56) References Cited

U.S. PATENT DOCUMENTS

| | | | | |
|---|---|---|---|---|
| 3,732,368 A | * | 5/1973 | Mahlab | ........................ 348/151 |
| 4,225,881 A | * | 9/1980 | Tovi | ............................ 348/151 |
| 4,341,452 A | * | 7/1982 | Korling | ...................... 396/428 |
| 4,764,008 A | | 8/1988 | Wren | ........................... 354/81 |
| 4,833,534 A | * | 5/1989 | Paff et al. | .................... 348/151 |
| 5,153,623 A | | 10/1992 | Bouvier | ....................... 354/81 |
| 5,627,616 A | * | 5/1997 | Sergeant et al. | ............. 348/143 |
| 5,735,742 A | * | 4/1998 | French | ......................... 463/25 |
| 5,905,923 A | | 5/1999 | Chitsaz et al. | .............. 396/428 |
| 6,375,369 B1 | * | 4/2002 | Schneider et al. | ........... 348/143 |
| 6,762,790 B1 | * | 7/2004 | Matko et al. | ................ 348/148 |

* cited by examiner

*Primary Examiner*—Luong T Nguyen
(74) *Attorney, Agent, or Firm*—Baker & Daniels LLP

(57) ABSTRACT

A camera mounting assembly for mounting a camera to a support structure. The mounting assembly including a first bracket fixable relative to the camera body such that the first bracket supports the camera. A second bracket engages the first bracket and is rotatable about a first axis relative to the second bracket. A third bracket supportingly engages the second bracket and is rotatable about a second axis relative to the third bracket. The first and second axes are substantially mutually perpendicular. The third bracket is securable to the support structure and is rotatable about a third axis relative to the support structure. The second and third axes are substantially mutually perpendicular. At least two of the first, second and third brackets are relatively translatable along a substantially linear length, and the first, second and third brackets are all securable relative to the support structure.

29 Claims, 3 Drawing Sheets

MOUNTING ASSEMBLY FOR CAMERA

BACKGROUND OF THE INVENTION

1. Field of the Invention

The present invention relates to surveillance camera systems and, more particularly, to multi-axes mounting assemblies for supporting a fixed position surveillance camera.

2. Description of the Related Art

Surveillance camera systems are commonly used by retail stores, banks, casinos and other organizations to monitor activities within a given area. The two main categories of surveillance cameras are (1) fixed position cameras, and (2) pan-tilt-zoom (PTZ) cameras. Fixed position cameras are mounted in a fixed position and cannot be readily adjusted after installation. Fixed position cameras acquire images of a fixed area. PTZ cameras are equipped to be readily adjusted after installation, such that PTZ cameras can pan, tilt or zoom to acquire images of different areas. Oftentimes, each camera is linked to a dedicated video display unit in a security surveillance room with surveillance personnel monitoring the multiple video display units.

Surveillance cameras may be mounted within a dome constructed of a one-way view material that is transparent when viewing outward and non-transparent when viewing inward to prevent unauthorized individuals from determining the area being viewed by the camera. The cameras are often fixedly mounted to a support structure using a mounting assembly. Such mounting assemblies are known to include means for manually adjusting the tilt and/or pan of fixed cameras during installation of the camera. The tilt of the camera generally refers to the pivoting of the camera about a horizontal access that is parallel to the floor, such that the lens of the camera tilts between an upward pointing position and a downward pointing position. The pan of the camera refers to the rotation of the camera about a vertical axis that is perpendicular to the floor, such that the lens moves from side to side.

Casino surveillance systems also commonly include one or more cameras dedicated to each gaming table. Since each camera is linked to a dedicated video display unit, the security surveillance room contains numerous video display units (one for each camera). As a result, surveillance personnel must monitor numerous video display units at once. To ease the transition between viewing one display unit to viewing the next display unit, it is beneficial if the angles of the views are consistent with one another. To achieve this consistency, the camera is "squared" with the gaming area of the table being monitored. When squaring a camera with a casino table, one might adjust the yaw angle of the camera such that an edge of the gaming area is aligned parallel with either a horizontal line or vertical line on the video display unit. The yaw refers to the rotation of the camera about a horizontal axis extending through the center of the lens, such that the camera body and lens are rotated as a single unit about the axis. By squaring each camera with its respective gaming table, each of the video display units display consistent views of the gaming tables. Some gaming commissions require the "squaring-up" of such fixed cameras used to monitor the action of gaming tables.

The squaring-up of a fixed camera with respect to a gaming table often requires rotation about the yaw axis of the camera. Standard surveillance cameras, fixed and PTZ cameras, mounted in retail stores, warehouses, factories, banks and other establishments that commonly employ surveillance cameras are typically not adjustable about the camera body or yaw axis as is required to "square-up" a camera with respect to a gaming table. This adjustment of the camera body produces an image, that while useful for monitoring gaming tables, produces an image that, in other contexts, would be considered awkward and at an unusual angle. Standard mounting assemblies for such cameras typically do not account for the easy adjustment of the camera about the yaw axis and, consequently, properly mounting such cameras in a casino can be relatively difficult.

A need exists for a camera mounting assembly that may be easily adjusted to facilitate the "squaring-up" of a surveillance camera with a gaming table.

SUMMARY OF THE INVENTION

The present invention provides a surveillance camera assembly having a multi-axes camera mounting assembly for supporting a fixed position surveillance camera.

The invention comprises, in one form thereof, a mounting assembly for mounting a camera to a support structure. The mounting assembly comprises first, second and third brackets. The first bracket is fixable relative to the camera body such that the first bracket supports the camera. The second bracket supportingly engages the first bracket and the first bracket is rotatable about a first axis relative to the second bracket. The third bracket supportingly engages the second bracket and the second bracket is rotatable about a second axis relative to the third bracket. The first and second axes are substantially mutually perpendicular. The third bracket is supportingly securable to the support structure wherein the third bracket is rotatable about a third axis relative to the support structure. The second and third axes are substantially mutually perpendicular. At least two of the first, second and third brackets are relatively translatable along a substantially linear length, and the first, second and third brackets are securable relative to the support structure whereby the camera may be fixedly mounted in a selected position.

In another form, the invention comprises a surveillance camera assembly mountable to a support structure and including a surveillance camera having a camera body and a lens wherein the lens defines a camera axis. A first bracket supports the camera and is relatively affixed with the camera body. A second bracket supportingly engages the first bracket. The first bracket is rotatable about a first axis relative to the second bracket. The first axis is collinear with the camera axis. A third bracket supportingly engages the second bracket, and the second bracket is rotatable about a second axis relative to the third bracket. The first and second axes are substantially mutually perpendicular. The third bracket is supportingly securable to the support structure wherein the third bracket is rotatable about a third axis relative to the support structure. The second and third axes are substantially mutually perpendicular. At least two of the first, second and third brackets are relatively translatable along a substantially linear length, and the first, second and third brackets are securable relative to the support structure so that the camera may be fixedly mounted in a selected position relative to the support structure.

The present invention also provides a method of mounting a camera including providing a mounting assembly having a first bracket, a second bracket and a third bracket wherein the brackets are relatively moveable; securing the camera to the first bracket; securing the third bracket to a support structure and wherein the second bracket supportingly couples the first and third brackets; independently selecting a rotational position of the camera about a first axis, a second axis and a third axis, the first, second and third axes being substantially mutually perpendicular; selecting a translational position of the camera; and securing the camera in the selected rotational positions about the first, second and third axes and in the selected translational position.

An advantage of the present invention is that the mounting assembly permits each of the yaw, tilt and pan angles of the camera to be independently adjusted without affecting the other angles.

Another advantage is that the mounting assembly of the present invention provides the ability to independently adjust the yaw angle of the camera which allows the camera to be easily squared-up with an object, such as a gaming table, in the field of view of the camera.

BRIEF DESCRIPTION OF THE DRAWINGS

The above mentioned and other features and objects of this invention, and the manner of attaining them, will become more apparent and the invention itself will be better understood by reference to the following description of an embodiment of the invention taken in conjunction with the accompanying drawings, wherein.

Figure 1:
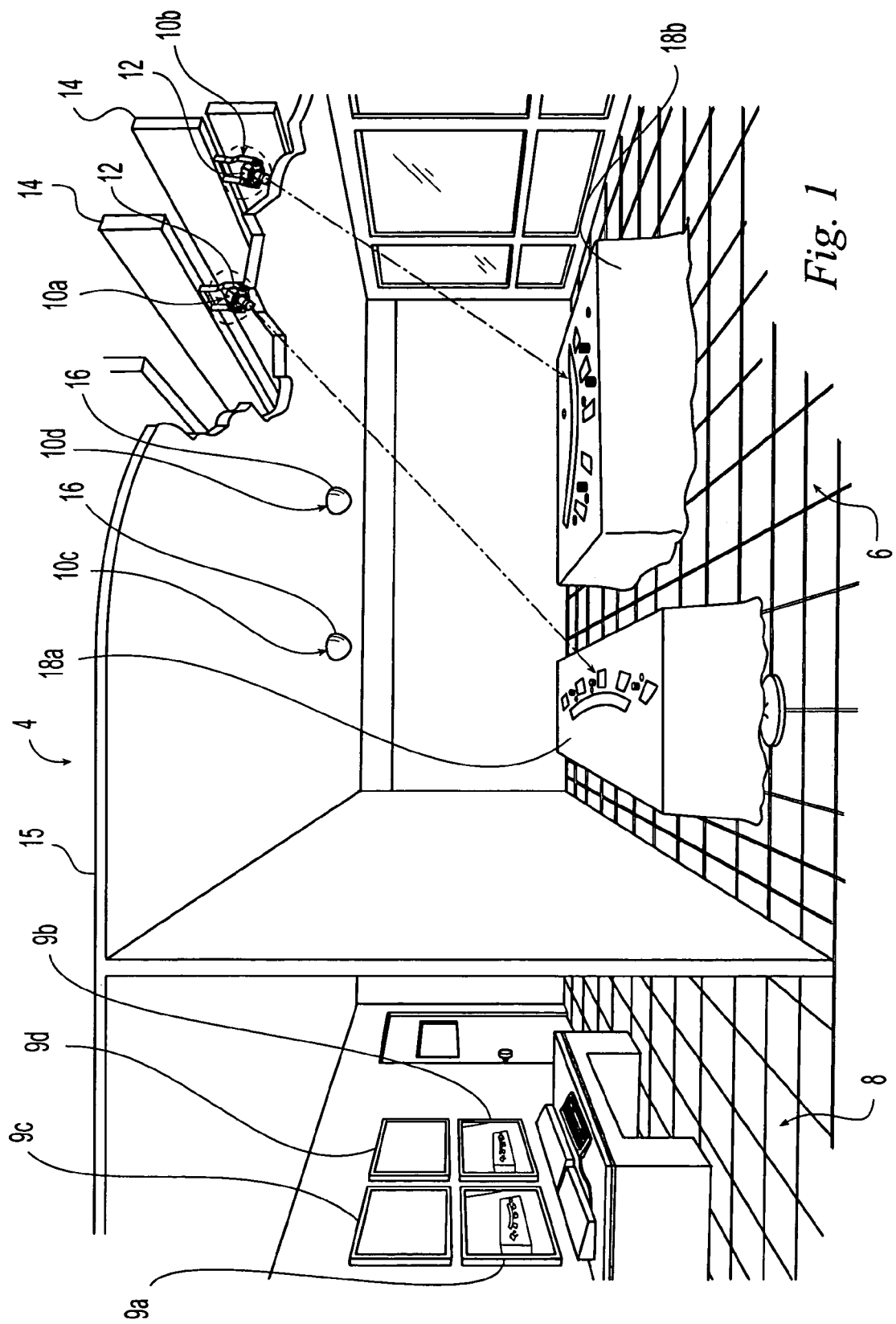
FIG. 1 is a perspective view of a casino having a surveillance system in accordance with the present invention.

Corresponding reference characters indicate corresponding parts throughout the several views. Although the exemplification set out herein illustrates the invention, in one form, the embodiment disclosed below is not intended to be exhaustive or to be construed as limiting the scope of the invention to the precise form disclosed.

DESCRIPTION OF THE PRESENT INVENTION

In accordance with the present invention, FIG. 1 illustrates a surveillance system 4 as used in a casino. Surveillance system 4 generally includes multiple fixed position camera assemblies 10a-d mounted within gaming area 6 of the casino and multiple video display units 9a-d disposed within security room 8 of the casino. Each camera assembly 10a-d includes camera 12 mounted to a support structure 14 by mounting assembly 20. Camera 12 includes camera body 12a and lens 12b and is positioned just below drop ceiling 15. The camera may be any suitable camera. Examples of cameras that may be used with the present invention are the LTC 0335 Dinion Monochrome Camera and the LTC 0435 Dinion Color Camera, both of which are commercially available from Bosch Security Systems, Inc. having a place of business at 130 Perinton Parkway, Fairport, N.Y., 14450. Although not required, camera 12 may be covered by a substantially hemispherical dome 16 if it is desired to conceal camera 12. Dome 16 is constructed of a material that is substantially transparent when viewing outwardly from a position within dome 16 and substantially opaque or non-transparent when viewed from a position outside of dome 16. Such domes are widely available for use with surveillance cameras and an example of one such dome is the TC9345MT12 Indoor Domed Housing commercially available from Bosch Security Systems, Inc. having a place of business at 130 Perinton Parkway, Fairport, N.Y., 14450. Dome 16 conceals camera 12 and its position from view by casino patrons while allowing camera 12 to view gaming area 6. Alternatively, camera assembly may be positioned behind a one-way view ceiling plate that lies flush with the ceiling or behind another suitable concealment device if it is desired to conceal camera 12 or be positioned where patrons can view the orientation of the camera if concealment of the camera is not desired. Each camera 12 of camera assemblies 10a-d is fixedly positioned to view a corresponding object in gaming area 6, such as gaming tables 18a-b. The position and angle of each camera 12 is set and adjusted by manipulating mounting assembly 20, as described in further detail below. Each camera 12 is linked to a corresponding video display unit 9a-d located in security room 8. The images viewed by camera 12 of camera assemblies 10a-d are displayed on corresponding video display units 9a-d.

Figure 2:
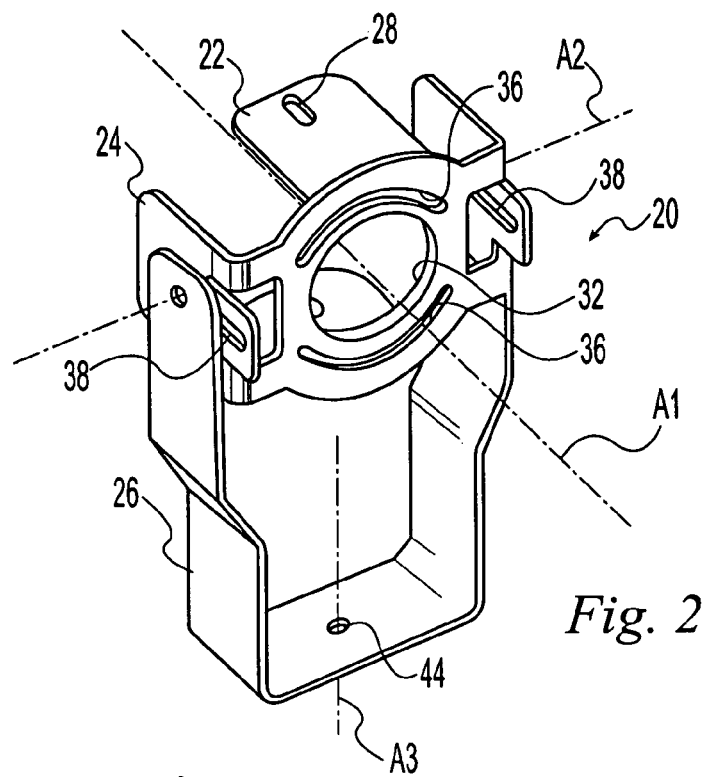
FIG. 2 is a perspective view of a camera mounting assembly according to one embodiment of the present invention.
Figure 3:
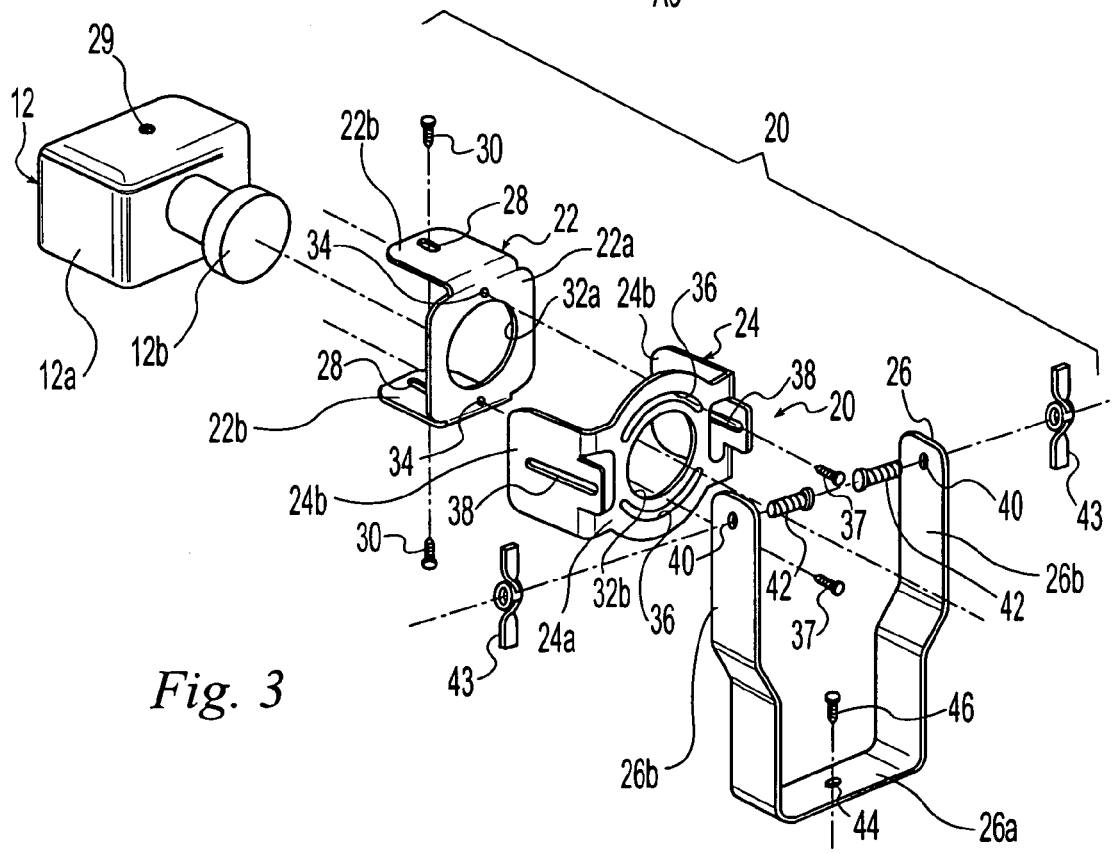
FIG. 3 is an exploded view of a surveillance camera assembly including the mounting assembly of FIG. 2.

Referring now to FIGS. 2 and 3, mounting assembly 20 generally includes a first bracket or yaw bracket 22, a second bracket or tilt bracket 24, and a third bracket or pan bracket 26. Yaw bracket 22 is substantially U-shaped and defines a face portion 22a and a pair of tabs 22b extending perpendicularly from face portion 22a. Face portion 22a includes central lens opening 32a for receiving camera lens 12b and a pair of yaw-lock fastener openings 34 for receiving yaw-lock fasteners 37. Each of tabs 22b defines a camera fastener opening 28 for receiving camera securing fastener 30. Tilt bracket 24 is substantially H-shaped and defines a central body portion 24a and a pair of opposing legs 24b extending perpendicularly to body portion 24a. Body portion 24a defines a central lens opening 32b for receiving camera lens 12b and a pair of arcuate yaw-adjusting slots 36 centered around, and positioned on diametrically opposite sides of, central lens opening 32b. Each of legs 24b of tilt bracket 24 define a linear slot 38. Pan bracket 26 is a substantially U-shaped bracket defining a mounting base portion 26a and a pair of arms 26b extending perpendicularly from mounting base portion 26a. A mounting opening 44 for receiving mounting fastener 46 is defined in base portion 26a and a tilt-lock fastener hole 40 for receiving tilt-lock fastener 42 is defined in each of legs 26b.

Figure 4:
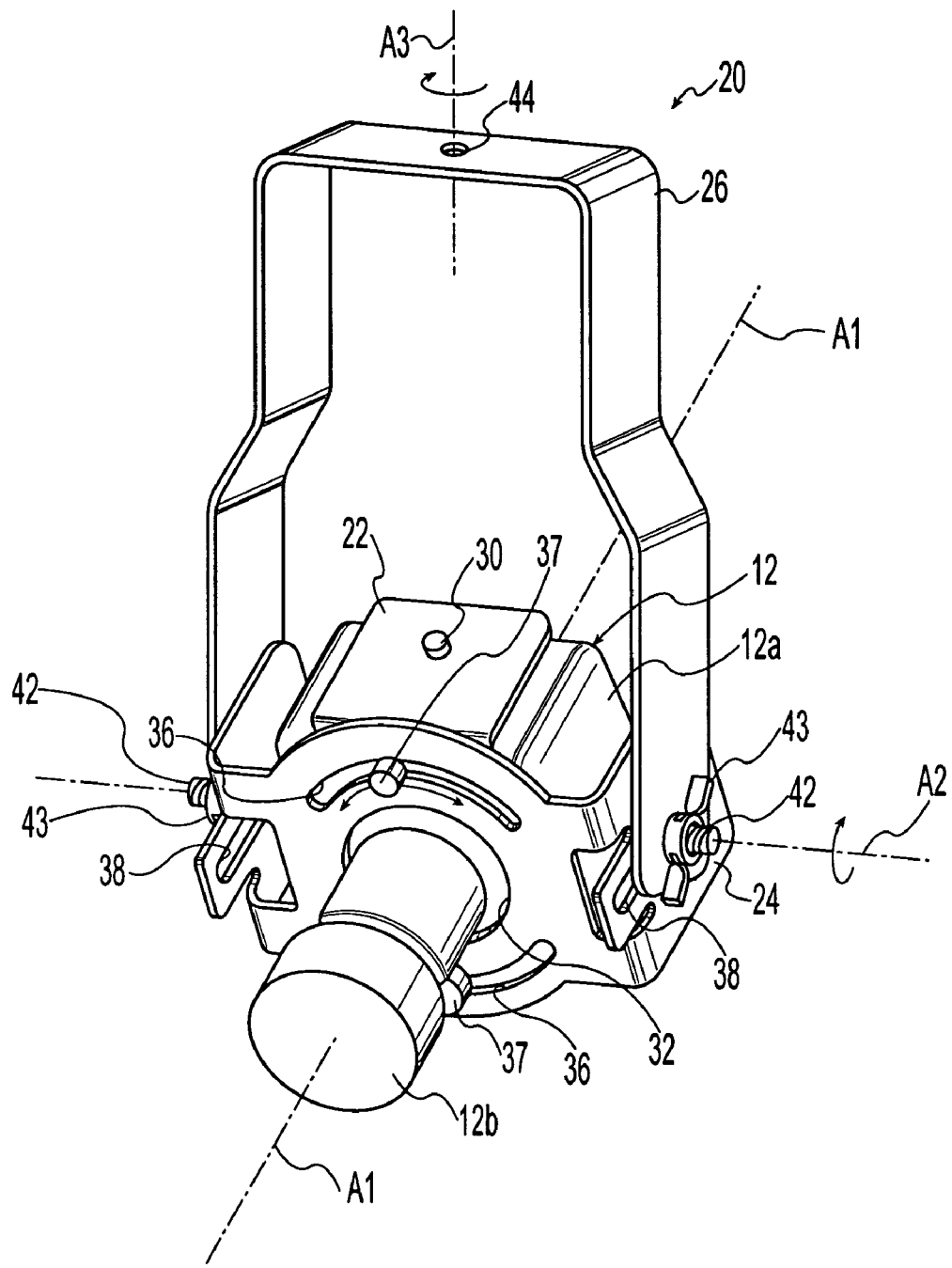
FIG. 4 is a perspective view of the surveillance camera assembly of FIG. 3.

Referring to FIGS. 3 and 4, mounting assembly 20 is assembled by securing, in no particular order, yaw bracket 22 to tilt bracket 24 and tilt bracket 24 to pan bracket 26. Yaw bracket 22 is secured to tilt bracket 24 by nestling yaw bracket 22 between legs 24b of tilt bracket 24 such that yaw-lock fastener openings 34 are aligned with arcuate slots 36 and central lens opening 32a is aligned with central lens opening 32b. Threaded yaw-lock fastener 37 is inserted through each arcuate slot 36 and threadedly engages corresponding yaw-lock fastener openings 34 to secure yaw bracket 22 to tilt bracket 24. Alternatively, a nut and bolt assembly may be used to secure yaw bracket 22 with respect to tilt bracket 24. Tilt bracket 24 is secured to pan bracket 26 by first positioning tilt bracket 24 between arms 26b of pan bracket 26 and aligning tilt-lock fastener holes 40 with linear slots 38. Threaded tilt-lock fasteners 42 are then inserted through slot 38 and holes 40 and are secured with wing nuts 43.

When yaw bracket 22 and tilt bracket 24 are joined, central openings 32a and 32b of yaw and tilt brackets 22, 24, respectively, cooperate to form central lens opening 32 as illustrated in FIGS. 2 and 4. Mounting assembly 20 is secured to camera 12 by inserting lens 12b through central lens opening 32 and nestling camera body 12a within tabs 22b of yaw bracket 22. Threaded openings 29 may be defined in body 12a of camera 12. Camera 12 is positioned such that threaded openings 29 are aligned with fastener openings 28 in tabs 22b. Camera securing fasteners 30 are then inserted through fastener openings 28 and are threadedly engaged within openings 29 to secure camera 12 to yaw bracket 22. It should be understood that tabs 22b of yaw bracket 22 may be adapted to accommodate different camera models. For instance, tabs 22b may vary in length or width to accommodate cameras of different body sizes. Tabs 22b may include multiple fastener openings or a fastener slot such that a single yaw bracket may be used with different camera models having threaded openings in different positions. Furthermore, the camera securing fasteners need not be designed to engage threaded openings in the camera body. Alternatively, the camera securing fasteners may be designed to grip or otherwise secure the camera body, thereby securing the camera in the yaw bracket and accommodating cameras not having fastener openings.

Turning to FIGS. 1 and 3, mounting assembly 20 is mounted to ceiling support structure 14 by placing mounting base portion 26a of pan bracket 26 against support structure 14, and inserting a mounting fastener 46 through mounting opening 44 and securing fastener 46 to support structure 14.

Referring now to FIGS. 2 and 4, adjustment of mounting assembly 20 and, thereby, the positioning of camera 12 will now be described. Mounting assembly 20 may be used to independently adjust three different angles of camera 12. More specifically, the yaw, tilt and pan may be independently modified using mounting assembly 20. Further, mounting assembly 20 may also be used, in conjunction with the tilt-lock fasteners 42, to adjust and center the camera linearly within dome 16.

Referring first to the yaw movement, a first axis or yaw axis $A_1$ extends through the center of camera lens 12b and central lens opening 32. The yaw of camera 12 is adjusted by rotating camera 12 about yaw axis $A_1$. To adjust the yaw, yaw-lock fasteners 37 are loosened and yaw bracket 22, along with camera 12, is rotated about yaw axis $A_1$. As yaw bracket 22 is rotated, yaw-lock fasteners 37 slide within arcuate yaw-adjusting slots 36, thereby maintaining alignment about yaw axis $A_1$. When the desired yaw is achieved, yaw-lock fasteners 37 are tightened, thereby locking yaw bracket in a fixed yaw position. When adjusting the yaw, no bracket other than the yaw bracket is moved, thus, the tilt and pan angles and linear position of the camera with respect to slots 38 are not affected by the yaw adjustment. The camera assembly of the present invention is particularly well adapted for use in casinos, because the ability to adjust the yaw of camera 12 allows camera 12 to be squared-up with the object of focus regardless of the camera's location relative to the object. For instance, referring to FIG. 1, cameras 12 of assemblies 10a, 10b are focused on gaming tables 18a, 18b, respectively, and send their images to video display units 9a, 9b, respectively. Without yaw adjustment, gaming tables 18a and 18b would likely be portrayed in a conventional manner wherein the rectilinear edges of the tables are neither horizontal or vertical in the display image but an angle dictated by the perspective required to create a two-dimensional representation of a three dimension space.

The mounting assembly of the present invention allows adjustment of the yaw to adjust the edge of the gaming area or table to be positioned either horizontally or vertically in the display image, i.e., "squared-up", and thereby provide a consistency to the display images that facilitates the monitoring of a large number of different display images. This is schematically depicted in FIG. 4.

Referring now to the tilt adjustment, a second axis or tilt axis $A_2$ extends through tilt-lock fasteners 42 and is substantially perpendicular to yaw axis $A_1$. The tilt of camera 12 is adjusted by pivoting camera 12 about axis $A_2$. To accomplish this movement, wing nuts 43 are loosened about tilt-lock fasteners 42 and bracket 24 is pivoted about axis $A_2$. When the desired tilt angle is achieved, wing nuts 43 may be tightened, once again, fixing tilt bracket 24 in position. When adjusting the tilt, no other bracket is moved, therefore, neither the yaw nor the pan is affected by the adjustment of the tilt. Camera 12 may be centered within a dome simultaneously with the adjustment of the tilt. To center camera 12, wing nuts 43 are loosened and tilt bracket 24 is translated linearly as fasteners 42 slide within linear slot 38. The camera 12 is fixed in position by tightening wing nuts 43 about tilt-lock fastener 42.

Referring now to the pan adjustment, a third axis or pan axis $A_3$ extends through mounting fastener 46 and is substantially perpendicular to tilt axis $A_2$. The pan of camera 12 is adjusted by rotating the camera about axis $A_3$. To accomplish this movement, mounting fastener 46 is loosened relative to ceiling support structure 14, and pan bracket 26 is rotated about axis $A_3$. When the desired pan angle is achieved, mounting fastener 46 is once again tightened to fix pan bracket 26 in position. When adjusting the pan of the camera, neither the yaw bracket nor the tilt bracket is moved, therefore, the yaw and tilt angles and translational position of the camera are not affected by the adjustment of the pan.

When installing and positioning camera 12, the pan, tilt and yaw adjustment may be made in any order. However, it is beneficial to first secure the pan, then the tilt, and finally, the yaw. The camera mounting bracket of the present invention provides means for independently adjusting the yaw, tilt and pan of the camera. As a result, one angle of the camera may be adjusted without affecting another angle, thereby minimizing confusion when positioning and adjusting the camera. In a gaming environment, it can be particularly advantageous to be able to first set the pan and tilt positions of the camera to generally center a gaming table within the field of view of the camera and then independently adjust the yaw angle of the camera to "square-up" the camera with respect to the gaming table.

Each of the yaw, tilt and pan brackets 22, 24, 26 may be constructed of any rigid material, such as a metal or plastic material. In one embodiment, each of the yaw, tilt and pan brackets are constructed from 13 gauge (AWG-American Wire Gauge) (0.18247 cm) cold-rolled steel. The configuration of the brackets makes them well-suited for manufacture from a sheet material and the illustrated brackets may be formed from sheet steel by conventional stamping and shaping methods. The brackets, however, may also be manufactured using other appropriate methods and materials.

While this invention has been described as having an exemplary design, the present invention may be further modified within the spirit and scope of this disclosure. This application is therefore intended to cover any variations, uses, or adaptations of the invention using its general principles.

What is claimed is:

1. A mounting assembly for mounting a camera to a support structure, the camera having a camera body and a lens, said assembly comprising:

a first bracket being fixable relative to the camera body wherein said first bracket supports the camera;

a second bracket supportingly engaging said first bracket, said first bracket being rotatable about a first axis relative to said second bracket;

a third bracket supportingly engaging said second bracket, said second bracket being rotatable about a second axis relative to said third bracket, said first and second axes being substantially mutually perpendicular, said third bracket being supportingly securable to the support structure wherein said third bracket is rotatable about a third axis relative to the support structure, said second and third axes being substantially mutually perpendicular; and wherein at least two of said first, second and third brackets are relatively translatable along a substantially linear length and wherein said first, second and third brackets are securable relative to said support structure whereby the camera may be fixedly mounted in a selected position, and wherein said second bracket defines at least one arcuate slot and said assembly further includes a fastener extending through said arcuate slot and engaging said first bracket, wherein repositioning said fastener in said arcuate slot rotates said first bracket relative to said second bracket about said first axis.

2. The mounting assembly of claim 1 wherein said second bracket defines a first linear slot and a second linear slot, said second and third brackets being engaged together by first and second fasteners, said first fastener extending through said first slot and said second fastener extending through said second slot wherein said first and second fasteners define said second axis and wherein said first and second fasteners are slidable in said first and second slots respectively.

3. The mounting assembly of claim 1 wherein said third bracket is pivotally mounted to the support structure with a fastener, said fastener defining said third axis.

4. The mounting assembly of claim 1 wherein said second bracket is linearly translatable relative to said third bracket.

5. The mounting assembly of claim 1 further comprising a substantially hemispherical dome, the camera being mountable within said dome, said dome being substantially transparent when viewing outwardly from a position within said dome, said dome being substantially opaque when viewed from a position external to said dome.

6. The mounting assembly of claim 1 wherein said third bracket is pivotally mounted to the support structure with a fastener, said fastener defining said third axis.

7. A mounting assembly for mounting a camera to a support structure, the camera having a camera body and a lens, said assembly comprising:
a first bracket being fixable relative to the camera body wherein said first bracket supports the camera;
a second bracket supportingly engaging said first bracket, said first bracket being rotatable about a first axis relative to said second bracket;
a third bracket supportingly engaging said second bracket, said second bracket being rotatable about a second axis relative to said third bracket, said first and second axes being substantially mutually perpendicular, said third bracket being supportingly securable to the support structure wherein said third bracket is rotatable about a third axis relative to the support structure, said second and third axes being substantially mutually perpendicular; and
wherein at least two of said first, second and third brackets are relatively translatable along a substantially linear length and wherein said first, second and third brackets are securable relative to said support structure whereby the camera may be fixedly mounted in a selected position, and wherein said second bracket defines a first linear slot and a second linear slot, said second and third brackets being engaged together by first and second fasteners, said first fastener extending through said first slot and said second fastener extending through said second slot wherein said first and second fasteners define said second axis and wherein said first and second fasteners are slidable in said first and second slots respectively; said third bracket being pivotally mounted to the support structure with a third fastener, said third fastener defining said third axis; and said second bracket defining at least one arcuate slot, a fourth fastener extending through said arcuate slot and engaging said first bracket wherein repositioning said fourth fastener in said arcuate slot rotates said first bracket relative to said second bracket about said first axis.

8. A mounting assembly for mounting a camera to a support structure, the camera having a camera body and a lens, said assembly comprising:
a first bracket being fixable relative to the camera body wherein said first bracket supports the camera;
a second bracket supportingly engaging said first bracket, said first bracket being rotatable about a first axis relative to said second bracket;
a third bracket supportingly engaging said second bracket, said second bracket being rotatable about a second axis relative to said third bracket, said first and second axes being substantially mutually perpendicular, said third bracket being supportingly securable to the support structure wherein said third bracket is rotatable about a third axis relative to the support structure, said second and third axes being substantially mutually perpendicular; and
wherein at least two of said first, second and third brackets are relatively translatable along a substantially linear length and wherein said first, second and third brackets are securable relative to said support structure whereby the camera may be fixedly mounted in a selected position, and wherein at least one of said first and second brackets define an arcuate slot and a fastener extends through said arcuate slot to define the relative rotational movement between said first and second brackets and secure said first and second brackets together in a desired relative position.

9. The mounting assembly of claim 8 wherein said first and second brackets further define a central opening through which the lens of the camera is insertable and wherein said arcuate slot is a circular arc centered on said central opening.

10. The camera assembly of claim 8 wherein said first bracket is directly secured to said camera body.

11. The camera assembly of claim 8 wherein said second bracket is linearly translatable relative to said third bracket.

12. The camera assembly of claim 8 further comprising a substantially hemispherical dome, said camera being mountable within said dome, said dome being substantially transparent when viewing outwardly from a position within said dome, said dome being substantially opaque when viewed from any position external to said dome.

13. The mounting assembly of claim 8 wherein said second bracket is linearly translatable relative to said third bracket.

14. The mounting assembly of claim 8 further comprising a substantially hemispherical dome, the camera being mountable within said dome, said dome being substantially transparent when viewing outwardly from a position within said dome, said dome being substantially opaque when viewed from a position external to said dome.

15. The mounting assembly of claim 8 wherein said third bracket is pivotally mounted to the support structure with a fastener, said fastener defining said third axis.

16. A surveillance camera assembly mountable to a support structure, said assembly comprising:
a surveillance camera having a camera body and a lens wherein said lens defines a camera axis;
a first bracket, said first bracket and camera body being relatively affixed wherein said first bracket supports said camera;
a second bracket supportingly engaging said first bracket, said first bracket being rotatable about a first axis relative to said second bracket, said first axis being collinear with said camera axis;

a third bracket supportingly engaging said second bracket, said second bracket being rotatable about a second axis relative to said third bracket, said first and second axes being substantially mutually perpendicular, said third bracket being supportingly securable to the support structure wherein said third bracket is rotatable about a third axis relative to the support structure, said second and third axes being substantially mutually perpendicular; and wherein at least two of said first, second and third brackets are relatively translatable along a substantially linear length and wherein said first, second and third brackets are securable relative to said support structure whereby said camera may be fixedly mounted in a selected position relative to the support structure, and wherein said second bracket defines at least one arcuate slot and said assembly further includes a fastener extending through said arcuate slot and engaging said first bracket, wherein repositioning said fastener in said arcuate slot rotates said first bracket relative to said second bracket about said first axis.

17. The camera assembly of claim 16 wherein said second bracket defines a first linear slot and a second linear slot, said second and third brackets being engaged together by first and second fasteners, said first fastener extending through said first slot and said second fastener extending through said second slot wherein said first and second fasteners define said second axis and wherein said first and second fasteners are slidable in said first and second slots respectively.

18. The camera assembly of claim 16 wherein said third bracket is pivotally mounted to the support structure with the fastener, said fastener defining said third axis.

19. The camera assembly of claim 16 wherein said first bracket is directly secured to said camera body.

20. The camera assembly of claim 16 wherein said second bracket is linearly translatable relative to said third bracket.

21. The camera assembly of claim 16 further comprising a substantially hemispherical dome, said camera being mountable within said dome, said dome being substantially transparent when viewing outwardly from a position within said dome, said dome being substantially opaque when viewed from a position external to said dome.

22. The camera assembly of claim 16 wherein said third bracket is pivotally mounted to the support structure with a fastener, said fastener defining said third axis.

23. A surveillance camera assembly mountable to a support structure, said assembly comprising:
a surveillance camera having a camera body and a lens wherein said lens defines a camera axis;
a first bracket, said first bracket and camera body being relatively affixed wherein said first bracket supports said camera;
a second bracket supportingly engaging said first bracket, said first bracket being rotatable about a first axis relative to said second bracket, said first axis being collinear with said camera axis;
a third bracket supportingly engaging said second bracket, said second bracket being rotatable about a second axis relative to said third bracket, said first and second axes being substantially mutually perpendicular, said third bracket being supportingly securable to the support structure wherein said third bracket is rotatable about a third axis relative to the support structure, said second and third axes being substantially mutually perpendicular; and wherein at least two of said first, second and third brackets are relatively translatable along a substantially linear length and wherein said first, second and third brackets are securable relative to said support structure whereby said camera may be fixedly mounted in a selected position relative to the support structure, and wherein said second bracket defines a first linear slot and a second linear slot, said second and third brackets being engaged together by first and second fasteners, said first fastener extending through said first slot and said second fastener extending through said second slot wherein said first and second fasteners define said second axis and wherein said first and second fasteners are slidable in said first and second slots respectively; said third bracket being pivotally mounted to the support structure with a third fastener, said third fastener defining said third axis; and said second bracket defining at least one arcuate slot, a fourth fastener extending through said arcuate slot and engaging said first bracket wherein repositioning said fourth fastener in said arcuate slot rotates said first bracket relative to said second bracket about said first axis.

24. A surveillance camera assembly mountable to a support structure, said assembly comprising:
a surveillance camera having a camera body and a lens wherein said lens defines a camera axis;
a first bracket, said first bracket and camera body being relatively affixed wherein said first bracket supports said camera;
a second bracket supportingly engaging said first bracket, said first bracket being rotatable about a first axis relative to said second bracket, said first axis being collinear with said camera axis;
a third bracket supportingly engaging said second bracket, said second bracket being rotatable about a second axis relative to said third bracket, said first and second axes being substantially mutually perpendicular, said third bracket being supportingly securable to the support structure wherein said third bracket is rotatable about a third axis relative to the support structure, said second and third axes being substantially mutually perpendicular; and wherein at least two of said first, second and third brackets are relatively translatable along a substantially linear length and wherein said first, second and third brackets are securable relative to said support structure whereby said camera may be fixedly mounted in a selected position relative to the support structure, and wherein at least one of said first and second brackets define an arcuate slot and a fastener extends through said arcuate slot to define the relative rotational movement between said first and second brackets and secure said first and second brackets together in a desired relative position.

25. The camera assembly of claim 24 wherein said first and second brackets further define a central opening through which said lens of said camera extends and wherein said arcuate slot is a circular arc centered on said central opening.

26. The camera assembly of claim 24 wherein said first bracket is directly secured to said camera body.

27. The camera assembly of claim 24 wherein said second bracket is linearly translatable relative to said third bracket.

28. The camera assembly of claim 24 further comprising a substantially hemispherical dome, said camera being mountable within said dome, said dome being substantially transparent when viewing outwardly from a position within said dome, said dome being substantially opaque when viewed from a position external to said dome.

29. The camera assembly of claim 24 wherein said third bracket is pivotally mounted to the support structure with a fastener, said fastener defining said third axis.

* * * * *